United States Patent
Bhamri et al.

(10) Patent No.: US 12,342,283 B2
(45) Date of Patent: Jun. 24, 2025

(54) POWER SAVING TECHNIQUES FOR NETWORK-CONTROLLED REPEATERS

(71) Applicant: Apple Inc., Cupertino, CA (US)

(72) Inventors: Ankit Bhamri, Bad Nauheim (DE); Hong He, Cupertino, CA (US); Sigen Ye, San Diego, CA (US); Chunxuan Ye, San Diego, CA (US); Wei Zeng, San Diego, CA (US); Huaning Niu, San Jose, CA (US); Oghenekome Oteri, San Diego, CA (US); Haitong Sun, Cupertino, CA (US); Dawei Zhang, Saratoga, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 17/884,867

(22) Filed: Aug. 10, 2022

(65) Prior Publication Data
US 2024/0056975 A1 Feb. 15, 2024

(51) Int. Cl.
*H04W 52/02* (2009.01)
*H04W 56/00* (2009.01)
(Continued)

(52) U.S. Cl.
CPC ..... *H04W 52/0232* (2013.01); *H04W 52/028* (2013.01); *H04W 56/001* (2013.01); *H04W 74/0833* (2013.01); *H04W 88/08* (2013.01)

(58) Field of Classification Search
CPC ........... H04B 7/15528; H04B 7/15542; H04W 52/0232; H04W 52/028; H04W 52/0206;
(Continued)

(56) References Cited

U.S. PATENT DOCUMENTS

| 2023/0268982 A1* | 8/2023 | Li | H04B 7/15507 370/315 |
| 2024/0049197 A1* | 2/2024 | MolavianJazi | H04W 72/23 |

FOREIGN PATENT DOCUMENTS

| CN | 119014108 A | * | 4/2023 | H04W 72/27 |
| CN | 118872366 A | * | 10/2024 | H04B 7/15528 |
| WO | 2022046757 | | 3/2022 | |

OTHER PUBLICATIONS

Qualcomm, "On Side Control Information for Network Controlled Repeaters (NCR)," 3GPP TSG RAN WG1 #109-e, R1-2205047, May 9, 2022, pp. 1-13. (Year: 2022).*

(Continued)

*Primary Examiner* — Donald L Mills
(74) *Attorney, Agent, or Firm* — Kowert, Hood, Munyon, Rankin & Goetzel, P.C.

(57) ABSTRACT

A network-controlled repeater (NCR) may receive configuration information from a base station to configure one or more receive (Rx) beams and corresponding time-domain resources for potential reception from one or more user equipments (UEs). The NCR may monitor for reception of a physical uplink channel or signal from the one or more UEs on the configured one or more Rx beams on the corresponding time-domain resources and determine that the physical uplink channel or signal is not received for at least a threshold amount of time. Additionally, the NCR may determine to refrain from at least one of additional monitoring for reception of the physical uplink channel or signal from the one or more UEs or transmission of one or more synchronization signal block (SSBs) to the one or more UEs for a duration of time.

20 Claims, 9 Drawing Sheets

(51) Int. Cl.
*H04W 74/0833* (2024.01)
*H04W 88/08* (2009.01)

(58) Field of Classification Search
CPC  H04W 56/001; H04W 74/0833; H04W 88/08
See application file for complete search history.

(56) References Cited

OTHER PUBLICATIONS

International Search Report for PCT/US2023/029606; Dec. 8, 2023.
LG Electronics "Discussion on side control information for NCR", 3GPP TSG RAN WG1 #109-e R1-2204532; May 9, 2022.

* cited by examiner

POWER SAVING TECHNIQUES FOR NETWORK-CONTROLLED REPEATERS

FIELD

The invention relates to wireless communications, and more particularly to apparatuses, systems, and methods for power saving techniques by a network-controlled repeater, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies. Improvements in the field are desired.

SUMMARY

Embodiments relate to wireless communications, and more particularly to apparatuses, systems, and methods for power saving techniques of a network-controlled repeater (NCR).

In some embodiments, the NCR may receive configuration information from a base station to configure one or more receive (Rx) beams and corresponding time-domain resources for potential reception from one or more user equipments (UEs). The NCR may monitor for reception of a physical uplink channel or signal from the one or more UEs on the configured one or more Rx beams on the corresponding time-domain resources and determine that the physical uplink channel or signal is not received for at least a threshold amount of time. Additionally, the NCR may determine to refrain from at least one of additional monitoring for reception of the physical uplink channel or signal from the one or more UEs or transmission of one or more synchronization signal block (SSBs) to the one or more UEs for a duration of time.

In some embodiments, the refraining from at least one of additional monitoring for reception of the physical uplink channel or signal from the one or more UEs or transmission of the one or more SSBs to the one or more UEs for a duration of time may include transitioning at least a portion of the transceiver circuitry to an OFF state. Additionally or alternatively, the transitioning of the at least a portion of the transceiver circuitry to the OFF state for the duration of time may include disabling or deconfiguring at least part of the transceiver circuitry for the duration of time.

According to some embodiments, a period of the threshold amount of time may correspond to a random access channel (RACH) resources periodicity. Additionally or alternatively, the threshold amount of time may be based on at least one of a fixed duration, a pre-configured or semi-statically configured table corresponding to one or more indexes, or a number of physical random access channel (PRACH) occasions within the threshold amount of time. In some embodiments, the physical uplink channel may include a physical random access channel (PRACH) or a configured grant physical uplink shared channel (PUSCH).

According to further embodiments, the NCR may be configured to adjust a period for monitoring of PRACH resources. Additionally or alternatively, the NCR may determine, based on the adjusted period, corresponding non-valid time-domain resources associated with at least one of the one or more configured Rx beams or one or more configured transmit (Tx) beams and disable the non-valid time domain resources, according to some embodiments. In some embodiments, the NCR may adjust, in response to the adjustment of the period of monitoring for the physical uplink channel or signal, a periodicity corresponding to subsequent transmission of the one or more SSBs.

According to some embodiments, a base station may be configured transmit configuration information to an NCR to configure one or more Rx beams and corresponding time-domain resources, wherein the configuration information may include at least one of a threshold amount of time or a duration of time. Additionally or alternatively, the threshold amount of time may correspond to the NCR's monitoring for a physical uplink channel or signal from one or more user equipments (UEs) on the one or more Rx beams on the corresponding time-domain resources and the duration of time may correspond to the NCR's refraining from at least one of additional monitoring for reception of the physical uplink channel or signal from the one or more UEs or transmission of one or more synchronization signal block (SSBs) to the one or more UEs. In some embodiments, the base station may be further configured to receive, from the NCR, a request message to adjust at least one of the threshold amount of time or duration of time and transmit, to the NCR, additional configuration information including at least one of an updated threshold amount of time or an updated duration of time.

According to some embodiments, the request message may include a request for the BS to perform at least one of a procedure to disable at least one of one or more transmitters or one or more receivers of the NCR, a procedure to update a pattern of ON and OFF states of the NCR. According to some embodiments, the BS may be configured to receive, from the NCR, signaling indicating that the NCR will disable at least one of one or more transmitters of the NCR or one or more receivers of the NCR.

In some scenarios, the BS may be configured to transmit, to the NCR, side control information, wherein the side control information is usable by the NCR for determination of at least one of not to encode or decode signaling for a duration of time. According to some embodiments the side control information may be transmitted via a physical downlink control channel (PDCCH) and may include configuration information as part of at least one of downlink control information (DCI), medium access control—control element (MAC-CE), or a system information block (SIB). Additionally or alternatively, the BS may be further configured to receive, from the NCR, a request for adjustment of a monitoring periodicity of a physical downlink control channel (PDCCH) carrying the side control information. In some embodiments, the BS may be configured to transmit, to the NCR, capability signaling indicating support of configuring the NCR for at least one of enabling or disabling at least one of one or more transmitters of the NCR or one or more receivers of the NCR or transmitting side control information with an adjusted periodicity.

In some embodiments, an NCR may be configured to receive, from a BS, configuration information to configure one or more Rx beams, wherein the configuration information includes at least one of a threshold amount of time or a duration of time. Additionally or alternatively, the threshold amount of time may corresponding to the NCR's monitoring for a physical uplink channel or signal from one or more user equipments (UEs) on the one or more Rx beams on the corresponding time-domain resources and the duration of time may correspond to the NCR's refraining from at least one of additional monitoring for reception of the physical uplink channel or signal from the one or more UEs or transmission of one or more synchronization signal block (SSBs) to the one or more UEs. In some embodiments, the NCR may be configured to transmit, to the BS, a request to adjust at least one of the threshold amount of time or duration of time. The NCR may also be configured to receive, from the BS, additional configuration information including at least one of an updated threshold amount of time or an updated duration of time.

According to further embodiments, the NCR may be configured to receive, from the BS, capability signaling indicating support of configuring the NCR for at least one of enabling or disabling at least one of the one or more transmitters or one or more receivers. In some embodiments, the request message may include a request for the BS to perform at least one of a procedure to disable at least one of one or more transmitters or one or more receivers of the NCR or a procedure to update a pattern of active and inactive states of the NCR. Additionally or alternatively, the NCR may be configured to transmit, to the NS, signaling indicating that the NCR will disable at least one of one or more transmitters of the NCR or one or more receivers of the NCR.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
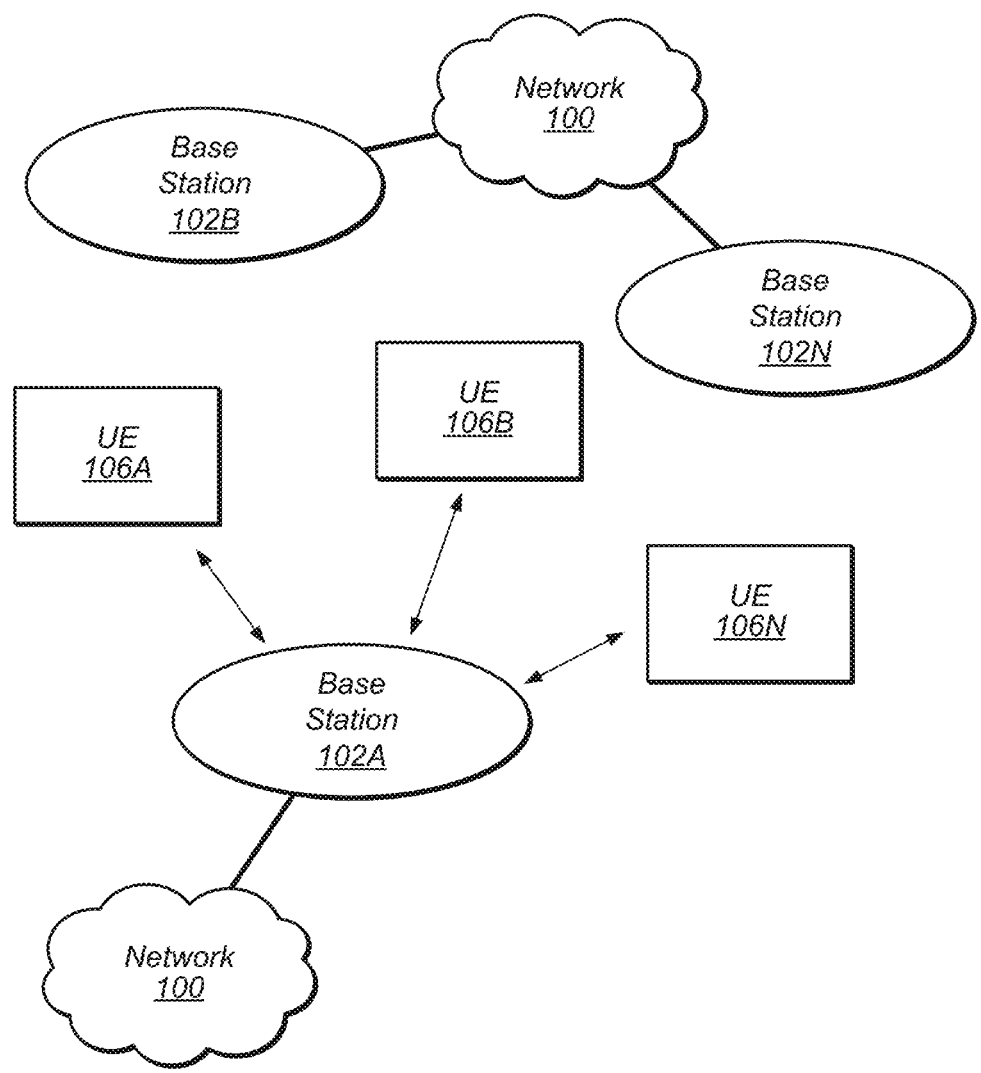
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
gNB: Next Generation NodeB
LTE: Long Term Evolution
NR: New Radio
NCR: Network Controlled Repeater
5GS: 5G System
5GMM: 5GS Mobility Management
5GC/5GCN: 5G Core Network
SIM: Subscriber Identity Module
eSIM: Embedded Subscriber Identity Module
CE: Control Element
MAC: Medium Access Control
SSB: Synchronization Signal Block PDCCH: Physical Downlink Control Channel
PDSCH: Physical Downlink Shared Channel
PUCCH: Physical Uplink Control Channel
PUSCH: Physical Uplink Shared Channel
RRC: Radio Resource Control
DCI: Downlink Control Information
FWD: Forward
MT: Mobile Termination
NW: Network
PRACH: Physical Random Access Channel
RAN: Radio Access Network
RRM: Radio Resource Management
TA: Timing Advance
TCI: Transmission Configuration Indication
DRX: Discontinuous Reception
C-Link: Control Link
TX: Transmission/Transmit
RX: Reception/Receive
UCI: Uplink Control Information
FR: Frequency Range Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
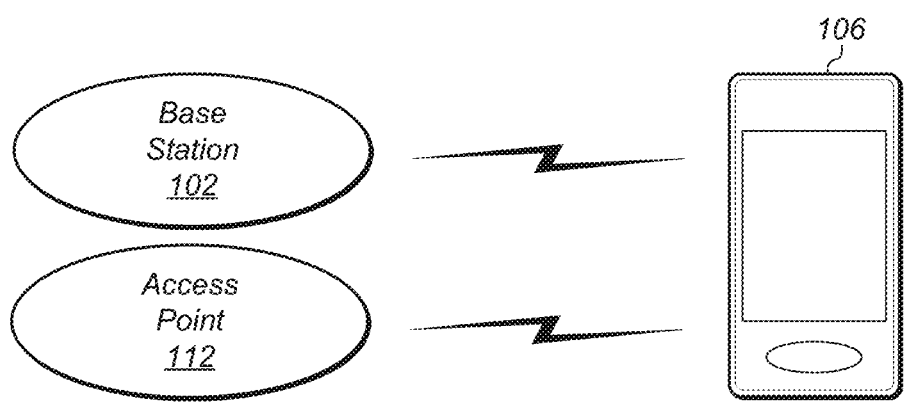
FIG. 1B illustrates an example of a base station and an access point in communication with a user equipment (UE) device, according to some embodiments.
Figure 1C:
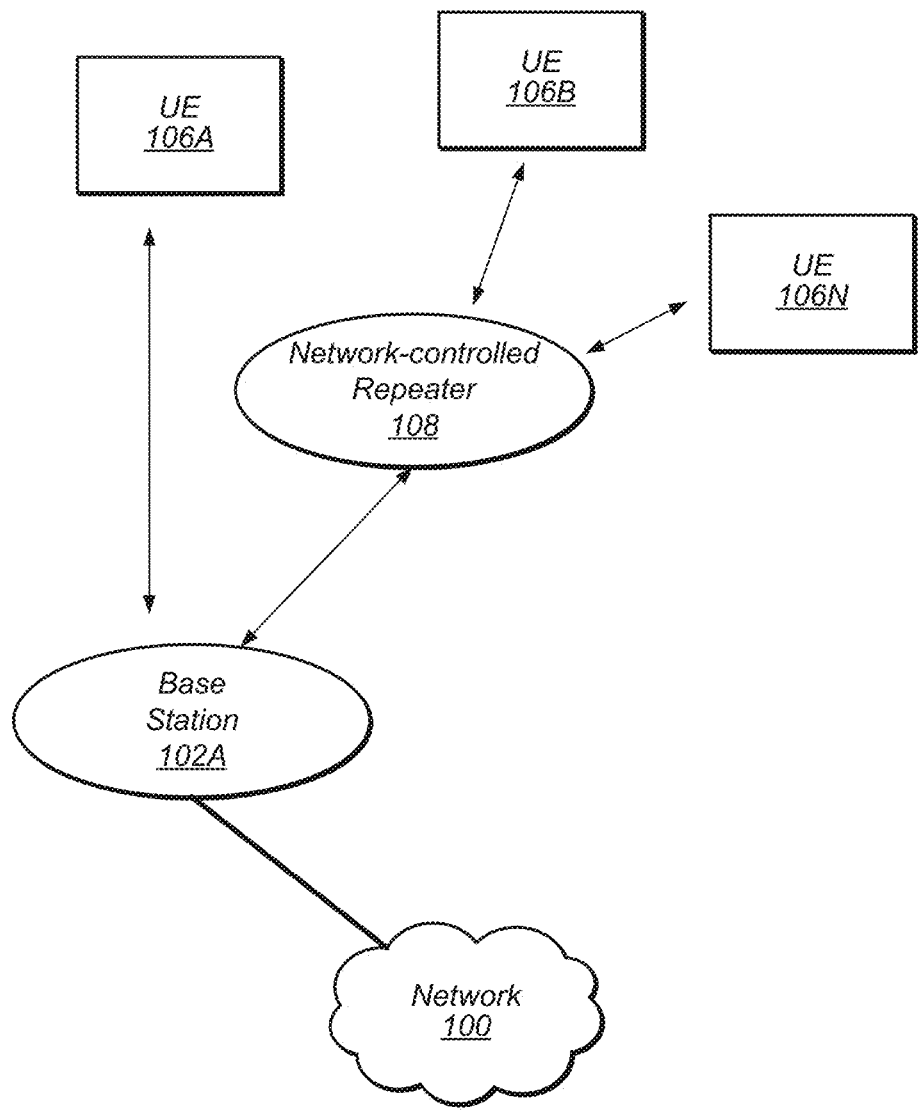
FIG. 1C illustrates an example wireless communication system including a network—controlled repeater (NCR), according to some embodiments.

FIGS. 1A-1C: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

FIG. 1C illustrates a communication scenario where a network-controlled repeater (NCR) 108 facilitates communications between a base station 102A and one or more UEs 102A-106N. In some deployments, a base station may be able to effectively communicate with a subset of its serviced UEs (e.g., UE 106A), but may be out of effective range of one or more other UEs (e.g., UE 106B). In this case, the network may direct an NCR 108 to forward/relay messages between the UE 106B and the base station. As described in greater detail below, the NCR may receive sidelink control information from the base station to configure the forwarding communications.

Figure 2:
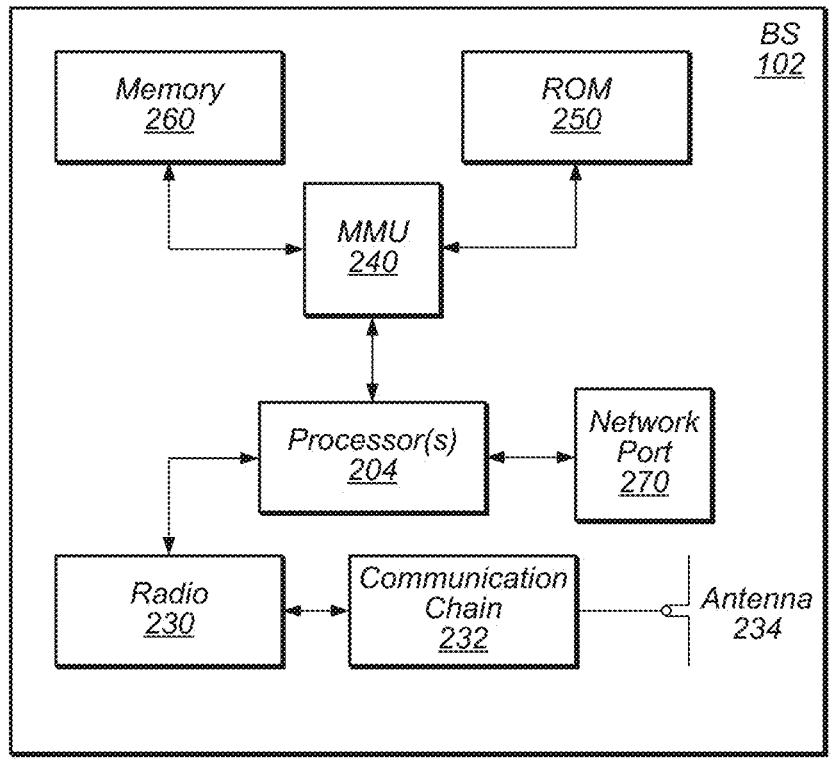
FIG. 2 illustrates an example block diagram of a base station, according to some embodiments.

FIG. 2: Block Diagram of a Base Station

Figure 3:
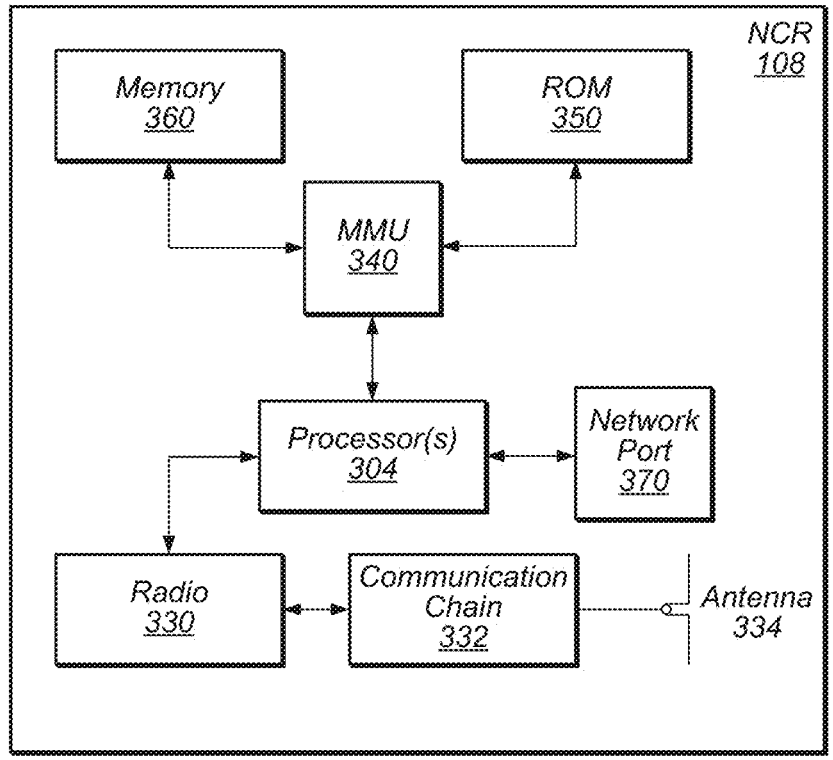
FIG. 3 illustrates an example block diagram of an NCR, according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of an NCR

FIG. 3 illustrates an example block diagram of a network-controlled repeater (NCR), according to some embodiments. It is noted that the NCR of FIG. 3 is merely one example of a possible NCR. As shown, the NCR 108 may include processor(s) 304 which may execute program instructions for the NCR 108. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The NCR 108 may include at least one network port 370. The network port 370 may be configured to couple to a base station, such as a gNB, and forward communications between the base station and a plurality of devices, such as UE devices 106, as described above in FIGS. 1 and 2.

In some embodiments, NCR 108 may communicate using a next generation cellular technology, e.g., a 5G New Radio (5G NR) radio access technology (RAT). The NCR 108 may include at least one antenna 334, possibly multiple antennas, as well as transceiver circuitry. The at least one antenna 334 may be configured to operate as a wireless transceiver (via the transceiver circuitry) and may be further configured to communicate with a base station 102 and UE devices 106 via radio 330. The antenna 334 communicates with the radio 330 via communication chain 332. Communication chain 332 may be a receive chain, a transmit chain or both. The radio 330 may be configured to communicate via various wireless communication standards, including, but not limited to, 5G NR, LTE, LTE-A, GSM, UMTS, CDMA2000, Wi-Fi, etc. In some scenarios, the NCR 108 may use various (e.g., different) radios 330, antennas 334, and/or communication chains 332 for communicating with the base station(s) 102 and UE(s) 106. Additionally or alternatively, these various components of the NCR may be independently enabled or disabled (e.g., turned ON/OFF) such that the communications between the NCR and the base station(s) 102 and/or UE(s) 106 may be separately controlled.

The NCR 108 may be configured to communicate wirelessly using multiple wireless communication standards. In some instances, the NCR 108 may include multiple radios, which may enable the NCR 108 to communicate according to multiple wireless communication technologies. For example, as one possibility, the NCR 108 may include an LTE radio for performing communication according to LTE as well as a 5G NR radio for performing communication according to 5G NR. In such a case, the NCR 108 may be capable of communicating with both an LTE base station, a 5G NR base station, and potentially a 6th generation base station. As another possibility, the NCR 108 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the NCR 108 may include hardware and software components for implementing or supporting implementation of features described herein. The processor 304 of the NCR 108 may be configured to implement or support implementation of part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof. Alternatively (or in addition) the processor 304 of the NCR 108, in conjunction with one or more of the other components 330, 332, 334, 340, 350, 360, 370 may be configured to implement or support implementation of part or all of the features described herein.

In addition, as described herein, processor(s) 304 may be comprised of one or more processing elements. In other words, one or more processing elements may be included in processor(s) 304. Thus, processor(s) 304 may include one or more integrated circuits (ICs) that are configured to perform the functions of processor(s) 204. In addition, each integrated circuit may include circuitry (e.g., first circuitry, second circuitry, etc.) configured to perform the functions of processor(s) 304.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 4:
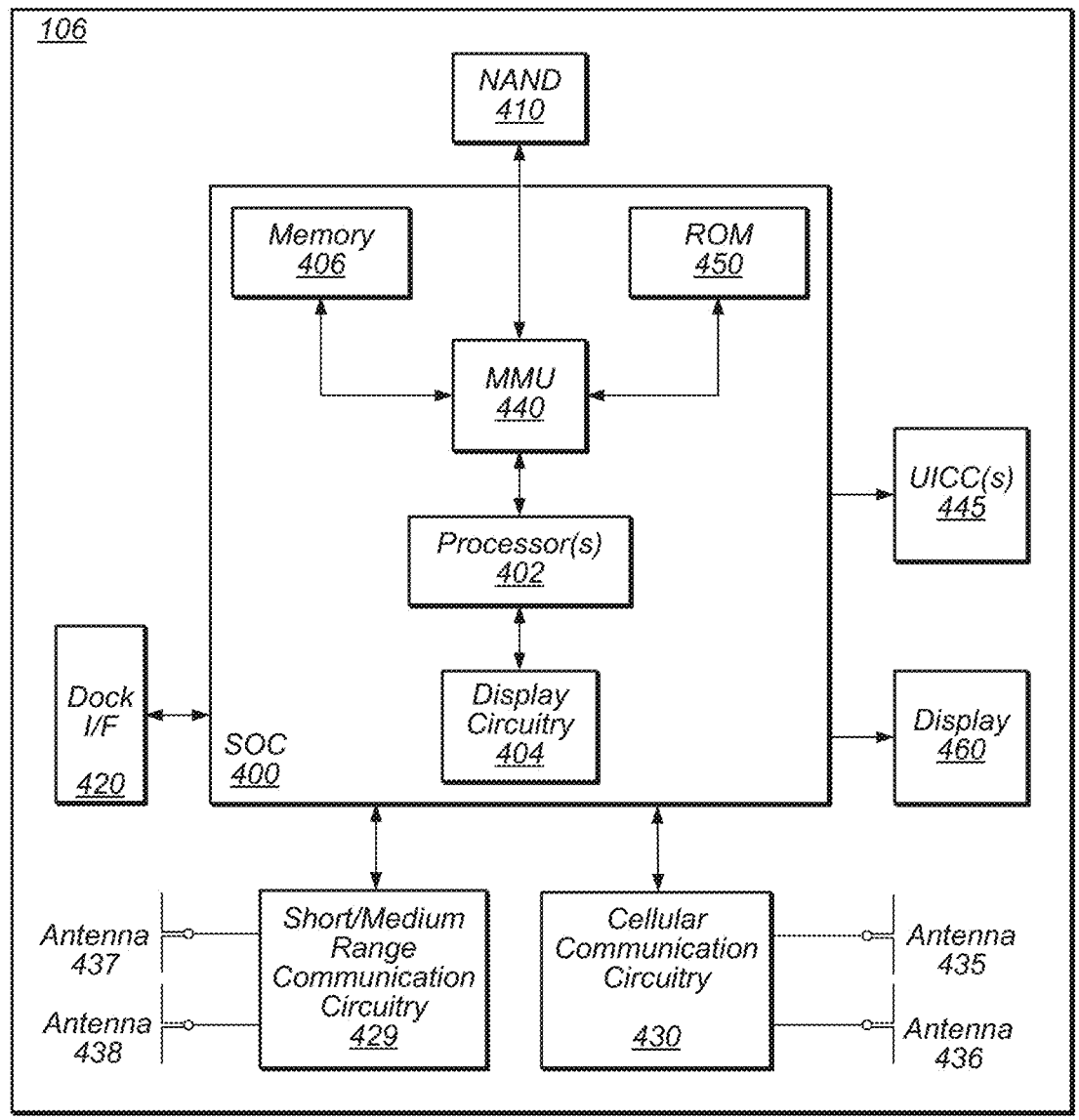
FIG. 4 illustrates an example block diagram of a UE, according to some embodiments.

FIG. 4: Block Diagram of a UE

FIG. 4 illustrates an example simplified block diagram of a UE 106, according to some embodiments. It is noted that the block diagram of the UE of FIG. 4 is only one example of a possible UE. According to embodiments, UE 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the UE 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the UE 106.

For example, the UE 106 may include various types of memory (e.g., including NAND flash memory 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the UE 106, and cellular communication circuitry 430 such as for 5G NR, LTE, GSM, etc., and short to medium range wireless communication circuitry 429 (e.g., Bluetooth™ and WLAN circuitry). In some embodiments, UE 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain. The UE 106 may be configured to communicate with one or more base stations 102 and network-controlled repeaters 108.

The UE 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The UE 106 may further include one or more smart cards 445 that include SIM (Subscriber Identity Module) functionality, such as one or more UICC(s)(Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM may be implemented as a removable smart card. Thus, the SIM(s) may be one or more removable smart cards (such as UICC cards, which are sometimes referred to as "SIM cards"), and/or the SIMs may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM may support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VOLTE) technology and/or voice over NR (VONR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the UE 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the UE 106 may be configured to communicate using wireless and/or wired communication circuitry. The UE 106 may be configured to perform methods for revocation and/or modification of user consent in MEC, e.g., in 5G NR systems and beyond, as further described herein.

As described herein, the processor 402 of the UE 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Power Saving Techniques for Network Controlled Repeaters

It is expected that in upcoming cellular deployments (e.g., 3GPP NR Rel-18), network-controlled repeaters (NCRs) may be utilized to improve the downlink (DL) and/or uplink (UL) coverage by deploying spatially directive repeaters in regions where the base stations (e.g., gNBs) and/or transmit receive points (TRPs) are not able to provide reliable coverage. Current implementations already deploy radio frequency (RF) repeaters that receive (without decoding), amplify and forward transmissions between base stations and UEs. However, in scenarios in which NCRs are not being utilized often (e.g., by UEs or BSs), power saving techniques may be beneficial in order to conserve power. For example, with network-controlled repeaters, a motivation for power conservation may be to introduce the capability for NCRs to autonomously or semi-autonomously control active usage of their receivers and/or transmitters (e.g., transceiver circuitry). Specifically for scenarios in which the NCRs are providing services to a minimal number of UEs (or no UEs), continuing to have its transceivers operating under normal conditions may not be very beneficial or power efficient. Therefore, NCRs that may control (or be controlled by the network) transceiver usage at the repeater may further improve how the NCR manages power conservation. To effectively and dynamically implement these power saving techniques, the NCRs may receive control information from the network to be instructed or configured to manage the states of its transceiver(s) or transceiver circuitry.

In some embodiments, an NCR providing uplink control information (UCI) to a base station may establish configurations from radio resource control (RRC), open application model (OAM), or it may be hard-coded, in various embodiments. These configurations may include configurations of the physical (PHY) channels to carry the L1/L2 signaling, including configurations for receiving PDCCH and/or PDSCH messaging, and transmitting PUCCH and/or PUSCH messaging. The L1/L2 signaling configurations may include configurations for downlink control information (DCI), side control information, UCI, and/or medium access control (MAC) control elements (CEs), in various embodiments. In some scenarios, the configurations may be usable by the NCR in forwarding of downlink signaling (received from the network) to one or more UEs. Additionally or alternatively, the configurations may be usable by the NCR in forwarding of uplink signaling (received from one or more UEs) to the network.

According to some scenarios, an NCR may typically be configured with both a control link (for communicating control information) and a backhaul link (for communicating information to be forwarded to the UE) for communications between the NCR and the gNB. Additionally, the NCR may be configured with an access link for communications with the UE (e.g., the forwarding of messages to the UE (from the BS) and from the UE (to the BS).

According to some embodiments, the NCR may be able to independently enable or disable (e.g., turn ON/OFF) transceiver circuitry corresponding to its access and backhaul links such that the communications between the NCR and the base station(s) 102 and/or UE(s) 106 may be separately controlled. However, in some instances when an NCR is not receiving any or substantial messaging/signaling for forwarding, the NCR may be overutilizing power. In other words, if the NCR has not received any signaling for forwarding (to the UE or BS) for an extended period of time, it may be beneficial for the NCR to reduce its power usage through management of its transceiver (e.g., transceiver circuitry) states. More specifically, the NCR may be able to conserve power by controlling whether or not its transmitters or receivers are being actively used. To address these and other concerns, embodiments herein present mechanisms to assist the NCR in conserving power through management of various transmission and/or reception components.

Figure 5:
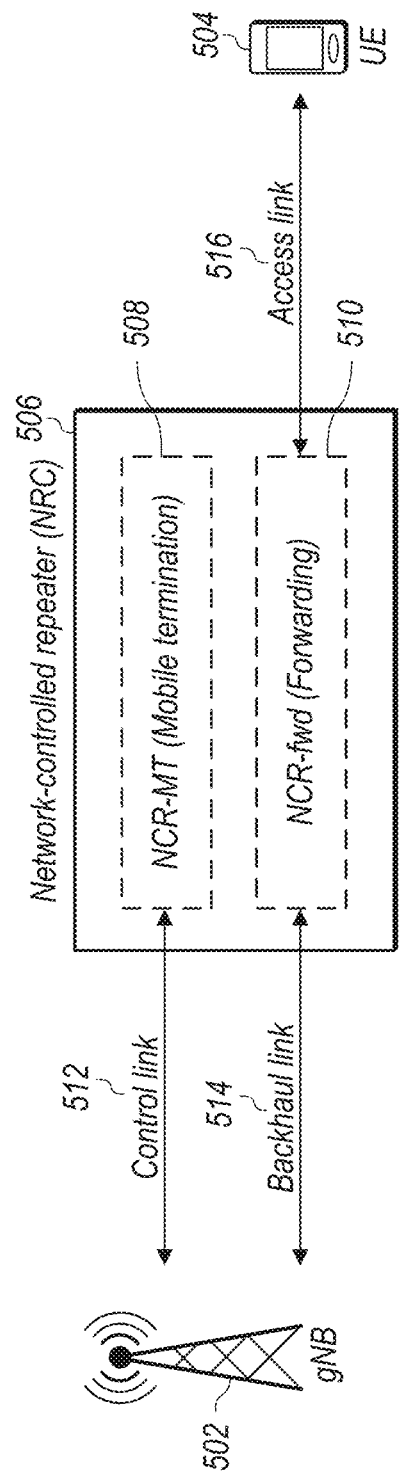
FIG. 5 illustrates an example architecture of an NCR including control and forwarding entities for communication with one or more network nodes and UEs, according to some embodiments.

FIG. 5—Example Communication System Including a Network Controlled Repeater (NCR)

FIG. 5 illustrates an example communication system including an NCR, a base station (e.g., gNB) and a UE, according to some embodiments. More specifically, FIG. 5 illustrates various links used by the NCR in forwarding of messages or signaling to and from the BS and one or more UEs.

For example, FIG. 5 illustrates gNB 502 communicating with NCR 506 via a control link 512 and a backhaul link 514. According to some embodiments, the control link 512 may be used by the gNB 502 to send control information to the NCR. For example, the control information provided by the gNB may include side control information or configuration information that may be usable by the NCR 506 in performing certain operations. Furthermore, the control link 512 may interface with a mobile termination (MT) entity of the NCR (NCR-MT). More specifically, the NCR-MT 508 may be described as a functional entity of the NCR used to communicate with the gNB via the control link 512 (also known as a C-link) to enable information exchanges of control information (e.g., side control information) which may be further used to control a forwarding entity of the NCR (NCR-Fwd 510). According to some embodiments, the C-link 512 may be based on a new radio (NR) Uu interface.

Additionally, the backhaul link 514 may be used by the NCR 506 in forwarding messages from one or more UEs such as UE 504. For example, the NCR 506 may receive signaling from UE 504 via access link 516 for forwarding to the gNB 502 via backhaul link 514. Moreover, the access link 516 may be used by the NCR 506 in forwarding messages to one or more UEs such as UE 504. For example, the NCR 506 may receive signaling from gNB 502 via backhaul link 514 for forwarding to the UE 504 via access link 516. Furthermore, the access link 516 and backhaul link 514 may both interface with a forwarding entity of the NCR (e.g., NCR-Fwd 510). More specifically, NCR-Fwd 510 may be described as a functional entity of the NCR to perform the forwarding of uplink (UL) or downlink (DL) radio frequency (RF) signaling (and potentially including amplification of the signaling) between gNB 502 and UE 504 via the backhaul link 514 and access link 516, according to some embodiments. Additionally or alternatively, the behavior or functionality of the NCR-Fwd 510 may be controlled according to the received side control information from the gNB 502.

Figure 6:
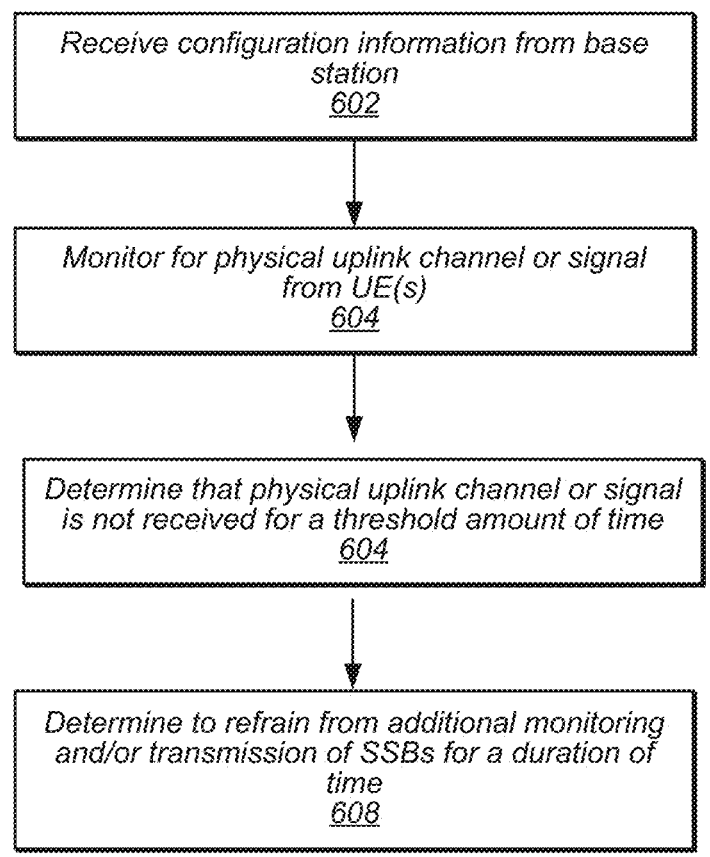
FIG. 6 is a flowchart diagram illustrating a method for power conservation for an NCR, according to some embodiments.

FIG. 6—Example Power Saving Method for an NCR

FIG. 6 illustrates an example of a flowchart diagram for a method for power conservation for an NCR, according to some embodiments. Aspects of the method of FIG. 6 may be implemented by a network-controlled repeater (NCR), e.g., in communication with a cellular base station such as BS 102 and one or more UEs 106A-N as illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. Aspects of the method of FIG. 6 may also be implemented from the perspective of the base station or a UE.

Note that while at least some elements of the method of FIG. 6 are described in a manner relating to the use of communication techniques and/or features associated with 3GPP and/or NR specification documents, such description is not intended to be limiting to the disclosure, and aspects of the method of FIG. 6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

At 602, the NCR may receive configuration information from a base station or other network node, according to some embodiments. According to some embodiments, the configuration information may be received by the NCR via the control link (C-link) and corresponding NCR-MT. Furthermore, the configuration information may include beam configuration information usable by the NCR in configuring one or more receive (Rx) or transmit (Tx) beams and corresponding time-domain resources for potential reception from the one or more UEs. For example, the configuration information may also indicate which time resources the configured beams need to be applied at the NCR-Fwd access link, according to some embodiments. Accordingly, the NCR may utilize these configured Rx or Tx beams for communicating with one or more UEs via an access link as well as a network node (e.g., gNB) via a backhaul and/or control link. Note that the same and/or different beams may be used for the access link relative to the backhaul and/or control links. For example, one set of beams may be configured for communication with the base station and another set of beams may be configured for communication with UEs. In other words, upon receiving configuration information from the network via the C-link between the gNB and the NCR-MT entity, the NCR may utilize this configuration information for subsequent forwarding of information via the NCR-Fwd entity through utilization of the access and backhaul links.

According to some embodiments, the NCR may receive side control information from the base station via the control link as part of or separately from the configuration information. For example, a variety of types of side control information may be exchanged between the gNB and the NCR, potentially including but not limited to beamforming information, scheduling information for subsequent transmissions and/or receptions of signaling performed by the NCR, information related to an UL-DL time-division duplex (TDD) configuration, active/inactive (ON/OFF) information for efficient interference management and improved energy efficiency, and/or power control information for efficient interference management (e.g, ON-OFF patterns), among other possibilities. In various embodiments, this side control information may be communicated through a combination of Layer 1 (L1) and/or Layer 2 (L2) signaling. Additionally or alternatively, the side control information may include configuration information as part of downlink control information (DCI), medium access control—control element (MAC-CE), or a system information block (SIB) such as SIB-1, according to some embodiments.

In some embodiments, implicit signaling such as beam information configured to the NCR may be applied for determining when to transition transceiver circuitry to an active state (e.g., turn ON) or inactive state (e.g., turn OFF). In other words, the NCR may receive configuration information from the network usable by the NCR in adjusting how and when its transceiver(s) are operating, according to some embodiments. For example, the network may be able to provide ON-OFF patterns to the NCR via the configuration information which may indicate which transceiver(s) should be inactive or active at specified times. Moreover, the configuration information may also indicate which time-domain resources the configured beams need to be applied at the appropriate NCR-Fwd link, according to some embodiments. According to some embodiments, when an NCR is not configured with any beams (e.g., not configured with any transmission configuration indicator (TCI) states) in certain slots/symbols to transmit and/or receive, then the NCR (or certain components of the NCR) may be configured to transition to an inactive state (e.g., turn OFF, as one example).

According to some embodiments, implicit signaling may involve the configuration of PRACH occasions and corresponding Rx beams for reception at the NCR from one or more UE(s). For example, the base station (e.g., gNB) may be able to configure the NCR to transmit synchronization signal blocks (SSBs) and receive corresponding PRACH signaling from the UE(s). However, depending on the beam information framework such as TCI, the BS may not know the Tx and Rx beams of the NCR-Fwd (e.g., corresponding to the access link) and therefore, it could be possible that one or more of the beams of the NCR are not currently serving any UEs. As one alternative, the BS may be aware of the Tx and Rx beams of the NCR-Fwd (based on configuration information provided by the BS to the NCR) and be able to further determine (based on the lack of forwarded transmissions) that the NCR is not currently providing forwarding or relaying services to any appreciable number of UEs (e.g., serving few to none UEs). Therefore, it may be beneficial for the NCR to autonomously or quasi-autonomously control its transceiver circuitry states or patterns thereof through controlled transitions between active (ON) and inactive (OFF) states depending on actual reception from UE(s) at the NCR-Fwd.

At 604, the NCR may monitor for reception of a physical uplink channel or signal from the one or more UEs on the configured one or more Rx beams on the corresponding time-domain resources. For example, the NCR may utilize the configuration information received by the network for monitoring one or more receive (Rx) beams corresponding to the UE(s). More specifically, the NCR may perform monitoring for a minimum duration or minimum number of instances or periods, according to some embodiments. For example, according to some embodiments, the NCR may monitor for PRACH signaling from one or more UEs on indicated or configured Rx beams for a threshold amount of time. In other words, the NCR may be configured to monitor for a specified, configured, or indicated amount of time. In some embodiments, the threshold amount of time may correspond to at least one of a minimum time value or a maximum time value. For example, a maximum threshold amount of time may correspond to a maximum allowed time for monitoring of signaling (e.g., PRACH) from the UE(s). According to some embodiments, the physical uplink channel may include a PRACH or configured grant physical uplink control channel (PUSCH).

In some embodiments, a period of the threshold amount of time may correspond to a random access channel (RACH) resources periodicity. For example, the RACH resources periodicity may correspond to a duration of a time after which a RACH resource pattern is repeated. In other words, the threshold amount of time may include one or more periods of time corresponding to RACH resources and periods associated with monitoring said RACH resources. For example, the threshold amount of time may correspond to a number of PRACH monitoring occasions multiplied by the duration of each PRACH monitoring occasion, according to some embodiments.

In some instances, the threshold amount of time may be based on at least one of a fixed duration. For example, the threshold amount of time may be pre-configured by the network, as one example. Additionally or alternatively, the threshold amount of time may be hard-coded as part of the NCR's operating procedures. For example, a threshold amount of time may be specified to the NCR based on known conditions or empirical data such that the NCR monitors for PRACH for an appropriate amount of time, according to some embodiments. According to some scenarios, the threshold amount of time may be based on values from a pre-configured or semi-statically configured table corresponding to one or more indexes. In other words, the threshold amount of time may be specified to the NCR using one or more indexes of a table (e.g., a lookup table) corresponding to preferred threshold values associated with known conditions or empirical data. Accordingly, the NCR may be able to flexibly apply an preferred threshold amount of time for monitoring using an appropriate index (of a lookup table) such that the NCR monitors for PRACH for a threshold amount of time based the conditions associated with the index, according to some embodiments.

In some embodiments, the NCR may be configured to adjust a periodicity for the monitoring of PRACH resources. In other words, the threshold amount of time may be adjusted such that monitoring window is increased or decreased. For example, if the NCR receives PRACH signaling numerous times within a monitoring window, the NCR may be able to decrease the threshold amount of time (e.g., monitoring period) while still receiving the appropriate signaling. In other words, the threshold amount of time may be further refined to reduce the amount of monitoring time necessary to receive the PRACH signaling. Additionally or alternatively, if no PRACH is received, the NCR may be able to extend or increase the monitoring window (e.g., the threshold amount of time) such that it provides more time for the NCR to potentially receive PRACH signaling from one or more UEs. Moreover, the NCR may be configured to adjust, in response to the adjustment of the period of monitoring for the physical uplink channel or signal, a periodicity corresponding to subsequent transmission of the one or more SSBs.

In some embodiments, the NCR may adjust the threshold amount of time based on received configuration information (e.g., from the network) or in response to signaling (or lack thereof) from zero or more UEs of which the NCR may be providing forwarding or relaying services to and/or from. Additionally or alternatively, the NCR may determine, based on an adjusted period, corresponding non-valid time-domain resources associated with at least one of the one or more configured Rx beams or one or more configured transmit (Tx) beams. Furthermore, the NCR may deconfigure or disable the determined time-domain resources (e.g., non-valid time-domain resources) corresponding to the adjusted monitoring window so as to more efficiently perform monitoring. In other words, the NCR may appropriately utilize and/or configure only valid time-domain resources to use for more accurate monitoring of the UE(s) the NCR is providing (or offering) forwarding service to.

At 606, the NCR may determine that the physical uplink channel or signal is not received for at least a threshold amount of time on the configured one or more Rx beams on the corresponding time-domain resources. For example, based on the monitoring performed for the threshold amount of time, the NCR may become aware or determine that it has not received physical uplink channel (e.g., PRACH) signaling from the one or more UEs on the configured beams. The NCR may configure resources for reception of PRACH signaling on one or more configured Rx beams corresponding to one or more UEs that the NCR may be providing forwarding services to. However, although the NCR may be configured with the Rx beams to receive signaling from the one or more UEs, the UEs may not be utilizing the NCR's forwarding services (e.g., not transmitting PRACH signaling) for forwarding of messages to the network. Accordingly, the NCR may not actually be receiving any signaling (e.g., PRACH signaling), particularly for semi-statically scheduled receptions.

At 608, the NCR may determine to refrain from at least one of additional monitoring for reception of the physical uplink channel or signal from the one or more UEs or transmission of one or more synchronization signal block (SSBs) to the one or more UEs for a duration of time. For example, in response to the determination that the physical uplink channel or signal is not received for at least a threshold amount of time on the configured one or more Rx beams on the corresponding time-domain resources, the NCR may choose to refrain from performing additional monitoring (e.g., reception) or transmission operations. According to some embodiments, refraining from performing said additional monitoring or transmissions may include transitioning to a state with less power consumption (e.g., inactive or OFF states) so as to conserve said power. As one example, the NCR may determine that since it has not received PRACH signaling from the one or more UEs during the specified monitoring window (e.g., corresponding to the threshold amount of time), it should refrain from making or encoding subsequent transmissions or performing any decoding procedure associated with any receptions. Additionally or alternatively, the NCR may transition at least a portion of its transceiver circuitry to an inactive state (e.g., an OFF state) via disabling or deconfiguration of appropriate portions of the transceiver circuitry (e.g., corresponding to various links of the NCR) so as to not perform transmit or receive procedures for a duration of time, according to some embodiments. Accordingly, the NCR may benefit from the power conservation of states associated with reduced or minimal transmissions and/or receptions.

In some embodiments, the duration of time associated with refraining from additional monitoring or SSB transmissions may be based on at least one of a fixed duration of time. For example, the duration of time (similarly to the threshold amount of time) may be pre-configured by the network, as one example. Additionally or alternatively, the duration of time may be hard-coded as part of the NCR's operating procedures. According to some scenarios, the duration of time may be based on values from a pre-configured or semi-statically configured table corresponding to one or more indexes. In some embodiments, the NCR may be configured to adjust the duration of time that the transceiver circuitry is in an inactive state. In other words, the duration of time may be adjusted such that time in which the NCR is refraining from transmitting or receiving signaling may be increased or decreased. In some embodiments, the NCR may adjust the duration of time based on received configuration information (e.g., from the network) or in response to signaling (or lack thereof) from one or more UEs which the NCR is serving.

According to some embodiments, the determination to not encode or decode subsequent signaling for the duration of time may include disabling at least part of the transceiver circuitry for the duration of time. For example, the NCR may, in response to determining that no PRACH signaling is expected for the threshold amount of time, disable or deconfigure one or more of its receivers and/or transmitters. In other words, the NCR may transition the receivers or transmitters associated with the NCR-MT and/or NCR-Fwd entities into less active or inactive states based on the lack of received PRACH signaling in the threshold amount of time, according to some embodiments.

In other embodiments, the NCR may perform additional monitoring for PRACH signaling from the one or more UEs after the duration of time has elapsed. For example, the NCR may configure the transition of the receiver/transmitter states to revert after the duration of time has elapsed. In some embodiments, a timer may be configured (by the NCR or external signaling from the network, for example) to correspond with the transition (and/or retransition) of the transceiver circuitry (or transmitters and/or receivers included as part of the transceiver circuitry) states such that upon start of the timer, the receiver(s) and/or transmitter(s) of the NCR-MT and/or NCR-Fwd transition to an inactive state. Additionally or alternatively, the NCR may configure a timer such that upon expiration of the timer, the NCR-MT and/or NCR-Fwd entities of the NCR may revert or retransition back to an active state of transmission, reception, and/or monitoring, according to some embodiments. In other words, the NCR and the duration of time corresponding to refraining from additional monitoring and/or transmission (e.g., not encoding or decoding signaling) may be configured such that normal encoding and/or decoding operations resume after the duration of time has elapsed.

According to some embodiments, the duration of time may be configured to increase to a maximum duration of time. For example, the NCR and/or external signaling (e.g., via the network) may configure the duration of time corresponding to a less active or inactive transmission/reception state may be adjustably increased up to a maximum amount of time. This maximum amount of time may be specified or limited such that the NCR does not enter an inactive state for an unsuitably long amount of time. In other words, the duration of time may be limited to a maximum amount of time such that the NCR will eventually revert back to the active state so as to avoid unsuitably long gaps in service provided to the UE(s). In some embodiments, the duration of time may be increased via an additive factor. For example, the duration of time may be incrementally increased according to a certain time period (e.g., 10 ms, 20 ms, for example). Additionally or alternatively, the incremental and additive time periods may correspond to a PRACH or RACH resource periodicity or period of time. For example, the PRACH or RACH resource periodicity may correspond to a duration after which the same PRACH or RACH resources pattern(s) are repeated. Accordingly, this periodicity (e.g., duration of time between repetitions), may be able to be adjusted by the NCR or network. According to further embodiments, the threshold amount of time may be configured (by the NCR or network, for example) to decrease or be reduced in addition to the duration of time being increased.

Figure 7:
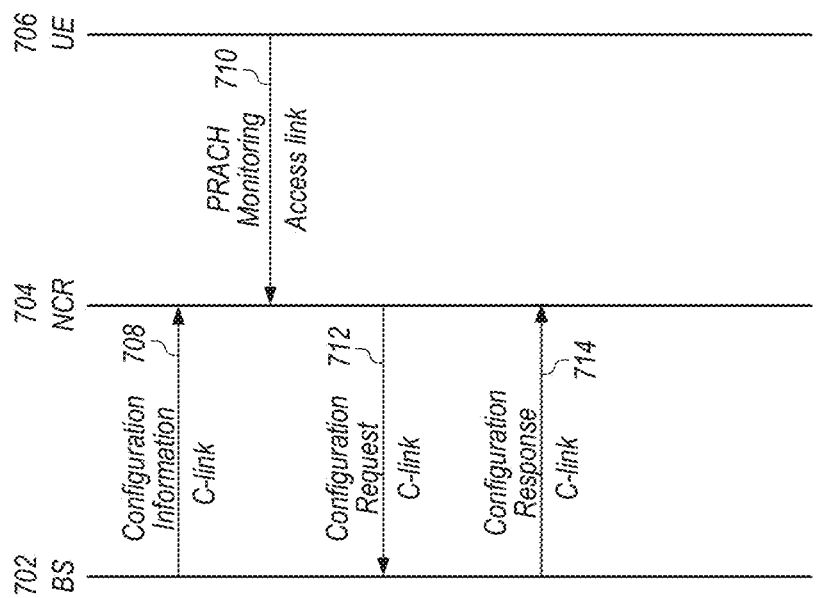
FIG. 7 is a communication flow diagram illustrating example aspects of a power conservation method of an NCR, according to some embodiments.

FIG. 7—Example Communication Flow of an NCR Power Conservation Method

FIG. 7 illustrates an example of a communication flow diagram illustrating example aspects of a method for power conservation for an NCR, according to some embodiments. Aspects of FIG. 7 are similar in some aspects to FIGS. 5 and 6, and may be used in conjunction with various aspects of these figures. Aspects of the method of FIG. 7 may be implemented by a network-controlled repeater (NCR), e.g., in communication with a cellular base station such as BS 102 and one or more UEs 106A-N as illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. Aspects of the method of FIG. 7 may also be implemented from the perspective of the base station or a UE.

Note that while at least some elements of the method of FIG. 7 are described in a manner relating to the use of communication techniques and/or features associated with 3GPP and/or NR specification documents, such description is not intended to be limiting to the disclosure, and aspects of the method of FIG. 7 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

For example, in 708, the NCR 704 may receive configuration information from base station 702 or other network node. According to some embodiments, the configuration information may be received by the NCR 704 via the control link (C-link) and corresponding NCR-MT as shown in 708. The configuration information may include beam configuration information usable by the NCR 704 in configuring one or more Rx or Tx beams and corresponding time-domain resources for communications with base station 702 and/or UE 706. In some embodiments, the configuration information may include at least one of a threshold amount of time or a duration of time. Additionally or alternatively, the threshold amount of time may correspond to the NCR's monitoring for a physical uplink channel or signal from one or more user equipments (UEs) on the one or more Rx beams on the corresponding time-domain resources and the duration of time may correspond to the NCR's refraining from at least one of additional monitoring for reception of the physical uplink channel or signal from the one or more UEs or transmission of one or more synchronization signal block (SSBs) to the one or more UEs.

Additionally or alternatively, the NCR 704 may receive side control information from the base station 702 via the control link as part of or separately from the configuration information received in 708. For example, as discussed above, a variety of types of side control information may be exchanged between the base station 702 and the NCR 704. In other words, the NCR 704 may receive configuration information in 708 to use for subsequent transmissions or receptions to and from base station 702 and/or UE 706.

For example, according to some embodiments, active/inactive (e.g., ON/OFF) patterns included in side control information may be considered as beneficial method to not only make the NCR more energy or power efficient, but also to avoid interference to and from the NCR with respect to other nodes in the system or network. More specifically, an NCR may be able to flexibly implement, utilize, and/or update ON/OFF patterns corresponding to active (ON) or inactive (OFF) transceiver states in order to efficiently conserve power, according to some embodiments.

At 710, the NCR 704 may monitor for reception of a physical uplink channel or signal from the one or more UEs such as UE 706. For example, the NCR 704 may utilize the configuration information provided in 708 for Rx or Tx beams and corresponding time-domain resources used for communicating with UE 706 via an access link. In other words, upon receiving configuration information from the network via the C-link between the base station 702 and the NCR-MT entity of the NCR 704, the NCR 704 may utilize this configuration information for subsequent forwarding of information via the NCR-Fwd entity through utilization of the access link. Accordingly, the NCR 704 may monitor for PRACH signaling in 710 that is expected to be received from the UE 706. Moreover, according to some embodiments, the NCR 704 may not receive a physical uplink channel or signal (e.g., PRACH signaling) from UE 706 and/or determine that the physical uplink channel or signal is not expected in a threshold amount of time.

However, explicit signaling and implicit signaling may be used to configure or signal active/inactive (e.g., ON/OFF) behavior for an NCR, according to some embodiments. For example, explicit signaling may include either a dynamic or semi-static indication of ON/OFF patterns which may be configured and implemented by the NCR. Moreover, the ON/OFF patterns may include information including duration and periodicity of both monitoring windows (ON) and inactive (OFF) states. In other words, the NCR may be able to utilize one or more ON/OFF patterns with flexibly adjusted durations and periods of monitoring (e.g., active) and/or inactive states so as to more efficiently conserve power or energy.

Accordingly, at 712, the NCR 704 may transmit a configuration request to the base station 702 via the control link. For example, the NCR 704 may, in response to determining that it has not received or does not expect a physical uplink channel or signal from UE 706, request instructions, information, or configuration updates from the network or base station 702. According to some embodiments, the NCR 704 may transmit, in response to the determination that the physical uplink channel or signal is not expected or received, a request to the base station 702 to perform or enable a procedure to disable, deconfigure, or cause a state transition of one of the NCR's transmitters, receivers, or transceiver circuitry, according to some embodiments. In other words, the NCR 704 may request updated configuration information or active/inactive (e.g., ON/OFF) patterns from the base station 702 in response to not receiving a physical uplink channel or signal from the UEs 706 and may request instruction from the base station 702. Furthermore, the NCR 704 may transmit, in response to not receiving the physical uplink channel or signal during the threshold amount of time, signaling to the base station 702 indicating that it plans to, intends to, or has transitioned at least some of its transceiver circuitry to an inactive (e.g., OFF) state, according to some embodiments.

Furthermore, at 714, the base station 702 may transmit a configuration response to the NCR 704 via the control link. For example, the base station 702 may transmit a response to the NCR 704 which may include configuration information usable by the NCR 704 in performing power saving methods. In some embodiments, the updated configuration information may include updated parameters specifying an updated threshold amount of time for subsequent physical uplink channel or signal monitoring events. For example, the base station 702 may provide an indication or updated configuration information such that the NCR 704 increases the threshold amount of time for monitoring (e.g., for PRACH signaling). Additionally or alternatively, the base station 702 may provide an updated ON/OFF pattern for the NCR. In other words, upon request from the NCR 704, the base station 702 may specify patterns and durations of time for which the NCR 704 is supposed to perform monitoring procedures as well as when the NCR 704 is supposed to be in an inactive or reduced power state (e.g., reduced transmissions and/or receptions).

According to some embodiments, this explicit indication may include active/inactive (ON/OFF) states (e.g., via dynamic or semi-static signaling) or ON/OFF patterns (e.g., periodic/semi-static ON/OFF patterns). Additionally or alternatively, the base station 702 may provide configuration information related to an updated or new discontinuous reception (DRX) pattern.

In other words, the network may be able to provide explicit signaling in order to specify power saving configurations for the NCR. More specifically, the network may be able to indicate the ON/OFF information to the NCR for controlling the behavior of the NCR-Fwd entity. However, explicit signaling may include additional power overhead due to the need for the NCR transmitting the request and as well as receiving the explicit indication of the information corresponding to the ON/OFF pattern(s) or other configuration information from the network.

According to some embodiments, the NCR may be configured by the network with a set of Tx beams and associated time-domain resources for forwarding multiple SSB beams to UE(s) via the NCR-Fwd access link in addition to being configured with a set of Rx beams and associated time-domain resources for reception on each of the PRACH occasions corresponding to SSB beams (and further forwarding the received PRACH to the BS via the NCR-Fwd backhaul link. However, if the NCR doesn't receive any PRACH (Msg1 or MsgA preamble) on the set of configured Rx beams for at least a duration of "N" periods (wherein one period corresponds to RACH resources periodicity), then the NCR may be able to request the network to transition to an inactive state (e.g., turn OFF) the NCR-Fwd for transmission of SSBs to the UE(s), according to some embodiments. Additionally or alternatively, the NCR may be able to request the network to transition to an inactive state (e.g., turn OFF) the receiver of the NCR-Fwd for reception of PRACH. In some embodiments, the NCR may be able to request the network to increase the periodicity of the SSBs (to be transmitted) and/or PRACH (to be received) such that the active/inactive (ON/OFF) pattern for the NCR-Fwd is updated. According to further embodiments, the NCR may opt to inform the network that it is going to transition to an inactive state (e.g., turn OFF) NCR-Fwd on the resources and/or beams configured for SSB and/or PRACH. Additionally or alternatively, the NCR may inform the network of its intention before or after transmitting the request for adjustment of the ON/OFF pattern on configured UL resources (for transmission to the base station).

Figure 8:
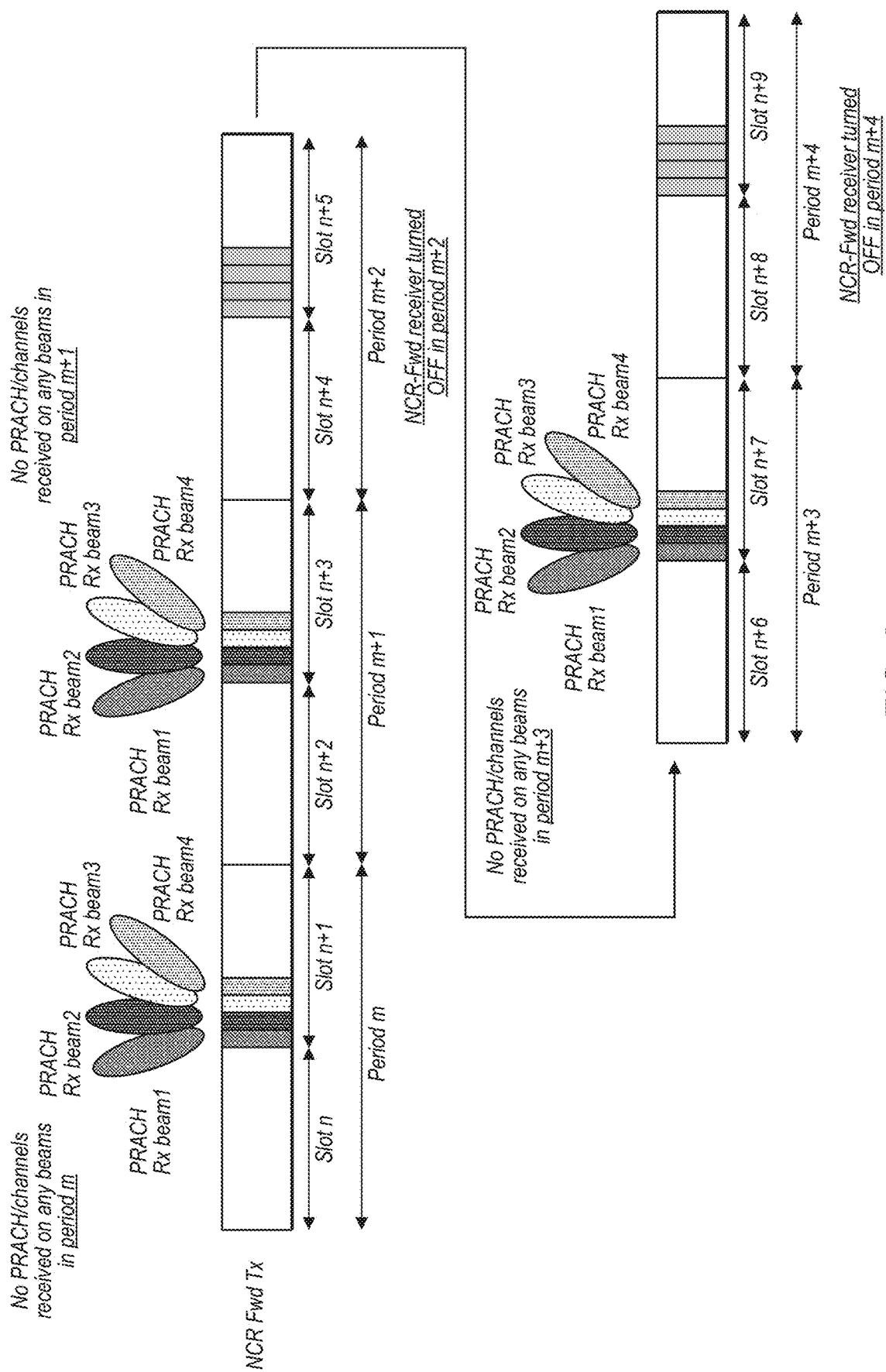
FIG. 8 illustrates an example timeline of physical random access channel (PRACH) reception as part of a method of power conservation of an NCR, according to some embodiments.

FIG. 8—Example PRACH Reception Timeline for an NCR Power Conservation Method FIG. 8 illustrates an example timeline of physical random access channel (PRACH) reception as part of a method of power conservation of an NCR, according to some embodiments.

As briefly discussed above in regard to FIGS. 6 and 7, an NCR may be able to adjust its ON/OFF pattern (internally or in response to network instruction), for at least some of its components. In other words, an NCR may be able to dynamically control and/or transition the inactive (e.g., OFF) or active (e.g., ON) states of its transceiver components (e.g., transceiver circuitry). Such transceiver components or circuitry may include the NCR-Fwd receiver at the access link for receiving uplink (UL) channels/signals from one or more UEs and for forwarding to a network node such as a gNB. Additionally or alternatively, said transceiver circuitry may include the NCR-Fwd transmitter at the access link for forwarding received (DL) channels/signals from the gNB to UE(s). Moreover, according to some embodiments, adjusting the pattern(s) may be in response to having no reception of PRACH signaling on the configured/indicated Rx beams for a minimum required duration or instances.

For example, an NCR may be configured by network with a set of Tx beams and associated time-domain resources for forwarding multiple SSB beams to one or more UE(s) via an NCR-Fwd access link. Additionally, an NCR may be configured with a set of Rx beams and associated time-domain resources for reception on each of the PRACH occasions corresponding to SSB beams (for forwarding the received PRACH to the gNB via the NCR-Fwd backhaul link). However, if the NCR doesn't receive any PRACH (Msg1 or MsgA preamble) on the set of configured Rx beams for at least a duration of "N" configured periods (wherein one period may correspond to RACH resources periodicity), then the NCR may autonomously or semi-autonomously transition to an inactive state (e.g., turn OFF) the NCR-Fwd receiver at the access link and NCR-Fwd transmitter at the backhaul link (e.g., enable a transition to an inactive state) on the corresponding time-domain resources associated with the set of configured Rx beams and/or Tx beams, according to some embodiments. Moreover, the NCR may not expect to further receive SSBs from the network (unless otherwise configured/indicated) and can autonomously or semi-autonomously transition to an inactive state (e.g., turn OFF) the NCR-Fwd receiver at the backhaul link and NCR-Fwd transmitter at the access link on the corresponding time-domain resources associated with the set of configured Tx and Rx beams, according to some embodiments.

FIG. 8 illustrates an example of an NCR power conservation method based on physical random access channel (PRACH) reception (or lack thereof). As one example, an NCR may be pre-configured (or hardcoded) with a minimum monitoring period of two periods. Accordingly, the NCR-Fwd shall monitor for two monitoring periods (periods m and period on one or multiple Rx beams to receive corresponding UL channels/signals for forwarding to a gNB. More specifically, FIG. 8 illustrates the example of an NCR which is semi-statically configured with four beams (PRACH Rx beams 1, 2, 3, and 4) corresponding to four symbols within a slot. Additionally, the periodicity (e.g., a duration after which the pattern of resources is repeated) of the four beams may be configured to for an interval of two slots. For example, as shown in FIG. 8, no PRACH signaling was received on the PRACH Rx beams (e.g., 1, 2, 3, and 4) in period m and more specifically in slot n+1. Additionally, no PRACH signaling was received on the PRACH Rx beams in period m+1 and more specifically in slot n+3. Accordingly, the NCR may have not received an uplink signaling (e.g., PRACH) on four beams for the configured two monitoring periods. More specifically, the NCR may not have received PRACH for periods m to m+1 corresponding to four slots (slot n to slot n+3).

Accordingly, the NCR-Fwd entity of the NCR may be configured to transition at least some of its transceiver circuitry (receiver and/or transmitter) to an inactive state (e.g., turning a receiver OFF) at the access link after the 2nd period of the configured beams, according to some embodiments. For example, as shown in FIG. 8, the NCR-Fwd receiver may be turned OFF in period m+2 and therefore not use PRACH Rx beams 1-4 for corresponding slot n+5. According to some embodiments, the NCR-Fwd may be configured to turn ON (e.g., transition to an active state) for other configured or dynamically signaled beams or based on some other explicit/implicit indication.

According to some embodiments, the NCR may be able to adjust its monitoring period and subsequently transition the NCR-Fwd receiver to an inactive state within a shorter time frame. More specifically, the NCR may be configured (internally or externally via the network), to reduce its monitoring period from two periods to one period after re-transitioning its NCR-Fwd receiver back to an active state (e.g., ON state). For example, as further illustrated in FIG. 8, the NCR may be configured to perform monitoring during period m+3 at slot n+7 using PRACH Rx beams 1,2,3, and 4. Accordingly, having not received uplink signaling on the Rx beams during period m+3, the NCR-Fwd may once again transition its receiver into an inactive or OFF state. In other words, FIG. 8 illustrates an example method of power conservation through use of a step-wise active/inactive (e.g., ON/OFF) pattern of operation. More specifically, FIG. 8 illustrates an NCR-Fwd receiver gradually and flexibly reducing its monitoring period (and in effect the time its receiver is in an active state) due to the lack of PRACH reception. Accordingly, the NCR may benefit from the power conserved as a result of the extended periods of reduced activity associated with the OFF state.

According to some embodiments, if the set of Rx beams for receiving PRACH are not explicitly configured, an NCR may be capable of beam correspondence through use of the corresponding Tx beams as Rx beams. Additionally or alternatively, configuration signaling may be applied to the step-wise method of FIG. 8. According to some embodiments, the network may provide configuration signaling to the NCR in order for it to determine the duration after which it can transition to an inactive state (e.g., turn OFF) at least one of its transmitters or receivers. For example, a fixed duration may be pre-configured or hard-coded and may further depend on a configured numerology and/or frequency range (FR). Accordingly, using the configured numerology and/or FR may allow the NCR to determine the number of slots and/or symbols to use for periods or monitoring or OFF states.

In some scenarios, a pre-configured or semi-statically configured table can be provided to the NCR by the network including an index of the table which may indicate the duration in terms of slots and/or symbols for which no reception needs to be monitored. Additionally or alternatively, the index of the configured table can be signaled by MAC-CE or DCI carrying side control information, according to some embodiments.

According to some instances, the duration may be dependent or associated with number of PRACH occasions within a monitoring period. For example, if the number of PRACH occasions within a monitoring period is X, then N periods are monitored for no reception. Additionally or alternatively, M (>N) periods may be monitored for no reception, according to some embodiments.

According to some embodiments, the NCR may be configured (either fixed, semi-statically or dynamically) with a factor to determine the step size increase in periodicity and the maximum allowed periodicity for reception of PRACH on the associated Rx beams and corresponding time-resources within a period. Additionally or alternatively, upon reaching the maximum periodicity, the NCR may be configured to correspondingly transition its NCR-Fwd transmitters and receivers to an inactive state (e.g., OFF) on all periods for RACH resources and/or SSB transmissions, according to some embodiments. In other words, the periodicity corresponding to a duration after which the time-resources are repeated may be increased incrementally to a maximum duration of time.

As one example, if the initial period of RACH resources is 10 ms, the multiplication factor is 2 for an increase in the period, and the maximum allowed period is 80 ms, then the period of the RACH resources may be increased gradually from 10 ms to 20 ms to 40 ms to 80 ms. Accordingly, with every step size increase in periodicity, the NCR may be turned OFF for every alternate period. For example, if an initial configuration includes the period of the RACH resources being 10 ms and the NCR is ON in all periods, when the period is increased to 20 ms, then effectively, the $1^{st}$ and $3^{rd}$ periods of the NCR may correspond to active (e.g., ON) states while, the 2nd and $4^{th}$ periods may be associated with inactive (e.g., OFF) states.

According to some embodiments, the duration for observing the reception of PRACH may be a fixed value regardless of the increase in the periodicity. Additionally or alternatively, the duration for observing the reception of PRACH may also be scaled as the periodicity is increased. For example, for an initial periodicity of 10 ms, the OFF duration may be two periods and accordingly when the periodicity is increased to 20 ms, the duration for observing the PRACH can be adjusted to one period. In another example, the factor for increasing the periodicity may be additive such that if the additive factor is one, then periodicity is increased by one. For example, if one period initially is 10 ms, then next updated period increased by factor of one will be 20 ms and the next updated period increased by the factor of one will be 30 ms. Accordingly, the periods could continue to be increased by the factor of one and potentially up to a maximum allowed periodicity.

Figure 9:
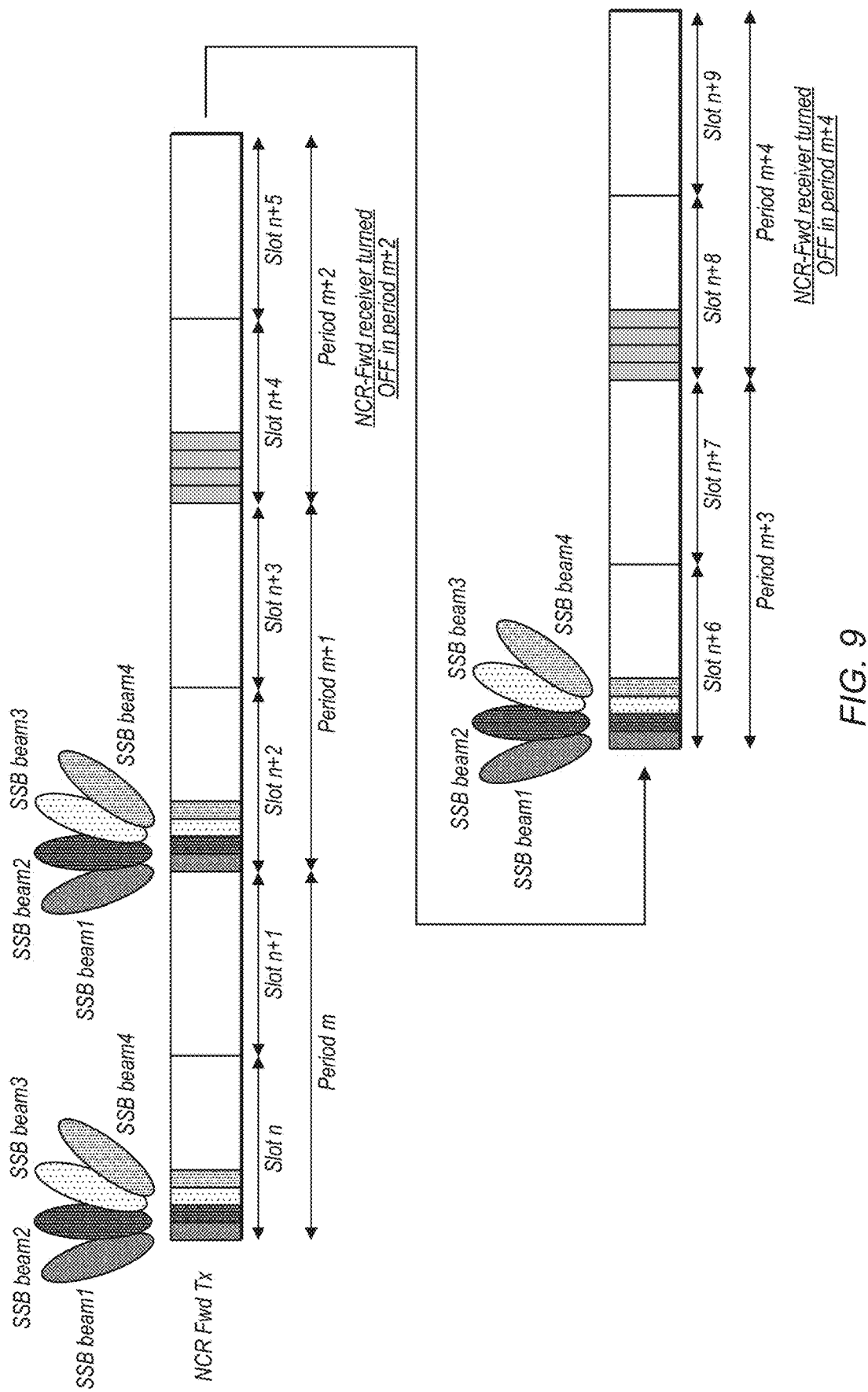
FIG. 9 illustrates an example timeline of synchronization signal block (SSB) transmission as part of a method of power conservation of an NCR, according to some embodiments.

FIG. 9—Example SSB Transmission Timeline for an NCR Power Conservation Method

FIG. 9 illustrates an example timeline of synchronization signal block (SSB) transmissions as part of a method of power conservation of an NCR, according to some embodiments.

More specifically, FIG. 9 illustrates an example scenario in which the NCR may be configured by the network with a set of Tx beams and associated time-domain resources for forwarding multiple SSB beams to UE(s) via the NCR-Fwd access link. Similar to the scenario described in FIG. 8, if the NCR doesn't receive any PRACH (Msg1 or MsgA preamble) on the set of configured Rx beams for at least a duration of "N" periods (a period corresponding to the RACH resources periodicity), then the NCR may be able to adjust the periodicity of the PRACH resources. In other words, the NCR may be able to adjust a duration of time for which the PRACH resources pattern are repeated. Furthermore, the NCR may be able to transition the NCR-Fwd transmitter to an inactive state (e.g., turn OFF) at the backhaul link on the corresponding time-domain resources associated with the set of configured Rx beams which may not be valid (e.g., be invalid or non-valid) due to the updated periodicity, according to some embodiments.

Additionally or alternatively, the NCR may be able to assume or determine that the periodicity of the SSBs is adjusted and therefore may not expect to receive SSBs from the network (unless otherwise configured/indicated). Accordingly, the NCR may opt to transition to an inactive state (e.g., turn OFF) the NCR-Fwd receiver at the backhaul link and NCR-Fwd transmitter at the access link on the corresponding time-domain resources associated with the set of configured Tx beams that are not valid (e.g., invalid) anymore based on the updated periodicity.

For example, FIG. 9 illustrates an example of an NCR power conservation method based on SSB transmission. As illustrated in FIG. 9, an NCR may be pre-configured (or hardcoded) with a minimum monitoring period of two periods, according to some embodiments. Accordingly, the NCR-Fwd may expect SSBs from the network (e.g., a base station) during two monitoring periods (period m and period m+1) on one or more SSB beams to receive corresponding DL channels/signals for forwarding to one or more UEs. More specifically, FIG. 9 illustrates the example of an NCR which is semi-statically configured with four beams (SSB beams 1, 2, 3, and 4) corresponding to four symbols within a slot. Additionally, the periodicity of the four beams may be configured to for an interval of two slots. For example, as shown in FIG. 8, no PRACH signaling was received on the PRACH Rx beams (e.g., 1, 2, 3, and 4) in period m and more specifically in slot n+1. Additionally, no PRACH signaling was received on the PRACH Rx beams in period m+1 and more specifically in slot n+3. Accordingly, the NCR may have not received an uplink signaling (e.g., PRACH) on four beams for the configured two monitoring periods. More specifically, the NCR may not have received PRACH for periods m to m+1 corresponding to four slots (slot n to slot n+3).

Accordingly, the NCR-Fwd entity of the NCR may be configured to transition at least some of its transceiver circuitry (e.g., a transmitter) to an inactive state (e.g., turning it OFF) at the access link after the 2nd period of the configured beams (e.g., after slot n+3), according to some embodiments. For example, as shown in FIG. 9, the NCR-Fwd transmitter may be transitioned into an inactive state (e.g., turned OFF) in at slot n+4 (corresponding to period m+2). According to some embodiments, the NCR-Fwd may be configured to turn ON (e.g., transition to an active state) for other configured or dynamically signaled beams or based on some other explicit/implicit indication.

According to some embodiments, the NCR may be able to adjust its monitoring period and subsequently transition the NCR-Fwd transmitter to an inactive state within a shorter time frame. More specifically, the NCR may be configured (internally or externally via the network), to reduce its monitoring period from two periods to one period after re-transitioning its NCR-Fwd transmitter back to an active state (e.g., ON state). For example, as further illustrated in FIG. 9, the NCR-Fwd transmitter may be transitioned into an inactive state (e.g., turned OFF) at slot n+4 (corresponding to period m+2). Accordingly, the NCR may not expect Tx SSB beams 1-4 again until slot n+6 (corresponding to m+3). In other words, FIG. 9 illustrates an example method of power conservation through use of a step-wise active/inactive (e.g., ON/OFF) pattern of operation. More specifically, FIG. 9 illustrates an NCR-Fwd transmitter gradually and flexibly reducing its transmission period (and in effect the time its transmitter is in an active state) due to not expecting any SSB transmissions to be made. Accordingly, the NCR may benefit from the power conserved as a result of the extended periods of reduced activity associated with the OFF state.

Additional Information

In some embodiments, the NCR may be configured to transition the receiver(s) and/or transmitter(s) of the NCR-MT to an inactive state (e.g., turn OFF) based on not receiving PRACH signaling for a certain duration of time (e.g., a threshold amount of time). Furthermore, the NCR may be configured to transition the NCR-MT to an inactive state based on reception of side control information including a semi-static configuration being applied, according to some embodiments. Additionally or alternatively, the periodicity of physical downlink control channel (PDCCH) monitoring for receiving side control information may be updated if there is no reception of PRACH at NCR-Fwd. For example, lack of reception of PRACH for a long duration of time may be indicative that the NCR is not serving any UE(s) (or a relatively small number of UE(s)) and therefore the periodicity (e.g., a duration of time after which the resource pattern(s) are repeated) of side control information (for example, via PDCCH) may also be increased. Accordingly, the NCR may be able to be in an inactive state (e.g., turned OFF) for longer durations of time.

In some embodiments, the network may be able to configure the NCR to activate or deactivate the feature of autonomous ON/OFF and/or autonomous update of periodicity corresponding to semi-static (and/or semi-persistent) channels/signals reception/transmission at the NCR. More specifically, such a configuration performed by the network may be done so semi-statically or dynamically as part of side control information delivered via DCI and/or MAC-CE, according to some embodiments. As one alternative, the configuration may be delivered via system information blocks (SIBs) such as SIB-1. In some embodiments, the network may be able to indicate through capability signaling whether it supports autonomous ON/OFF and/or autonomous update of periodicity. In other words, the network may inform the NCR that it can or cannot perform updates of periodicities for autonomous ON/OFF patterns.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   at least one processor configured to cause a base station (BS) to:
      transmit, to a network controlled repeater (NCR), configuration information to configure one or more receive (Rx) beams and corresponding time-domain resources, wherein:
         the configuration information comprises at least one of a threshold amount of time or a duration of time,
         the threshold amount of time corresponds to the NCR's monitoring for a physical uplink channel or signal from one or more user equipments (UEs) on the one or more Rx beams on the corresponding time-domain resources, and
         the duration of time corresponds to the NCR's refraining from at least one of additional monitoring for reception of the physical uplink channel or signal from the one or more UEs or transmission of one or more synchronization signal block (SSBs) to the one or more UEs;
      receive, from the NCR, a request message to adjust at least one of the threshold amount of time or duration of time; and
      transmit, to the NCR, additional configuration information including at least one of an updated threshold amount of time or an updated duration of time.

2. The apparatus of claim 1,
   wherein the request message includes a request for the BS to perform at least one of:
      a procedure to disable at least one of one or more transmitters or one or more receivers of the NCR; or
      a procedure to update a pattern of ON and OFF states for the NCR.

3. The apparatus of claim 1, wherein the at least one processor is further configured to cause the BS to:
   receive, from the NCR, signaling indicating that the NCR will disable at least one of one or more transmitters of the NCR or one or more receivers of the NCR.

4. The apparatus of claim 1, wherein the at least one processor is further configured to cause the BS to:
   transmit, to the NCR, side control information, wherein the side control information is usable by the NCR for determination of at least one of not to encode or decode signaling for a duration of time.

5. The apparatus of claim 4,
   wherein the side control information is transmitted via a physical downlink control channel (PDCCH).

6. The apparatus of claim 4,
   wherein the side control information comprises configuration information included as part of at least one of downlink control information (DCI), medium access control-control element (MAC-CE), or a system information block (SIB).

7. The apparatus of claim 4, wherein the at least one processor is further configured to cause the BS to:
receive, from the NCR, a request for adjustment of a monitoring periodicity of a physical downlink control channel (PDCCH) carrying the side control information.

8. The apparatus of claim 1, wherein the at least one processor is further configured to cause the BS to:
transmit, to the NCR, capability signaling indicating support of configuring the NCR for at least one of enabling or disabling at least one of one or more transmitters of the NCR or one or more receivers of the NCR or transmitting side control information with an adjusted periodicity.

9. A network controlled repeater (NCR), comprising:
transceiver circuitry configured to perform cellular communication with at least one base station (BS) and one or more user equipments (UEs) using at least one radio access technology (RAT);
one or more processors coupled to the transceiver circuitry, wherein the one or more processors are configured to cause the NCR to:
receive, from the at least one BS, configuration information to configure one or more receive (Rx) beams and corresponding time-domain resources, wherein:
the configuration information comprises at least one of a threshold amount of time or a duration of time,
the threshold amount of time corresponds to the NCR's monitoring for a physical uplink channel or signal from one or more user equipments (UEs) on the one or more Rx beams on the corresponding time-domain resources, and
the duration of time corresponds to the NCR's refraining from at least one of additional monitoring for reception of the physical uplink channel or signal from the one or more UEs or transmission of one or more synchronization signal block (SSBs) to the one or more UEs;
transmit, to the at least one BS, a request to adjust at least one of the threshold amount of time or duration of time; and
receive, from the at least one BS, additional configuration information including at least one of an updated threshold amount of time or an updated duration of time.

10. The NCR of claim 9,
wherein the one or more processors are further configured to cause the NCR to:
receive, from the BS, capability signaling indicating support of configuring the NCR for at least one of enabling or disabling at least one of one or more transmitters or one or more receivers.

11. The NCR of claim 9,
wherein the request indicates for the BS to perform at least one of:
a procedure to disable at least one of one or more transmitters or one or more receivers of the NCR; or
a procedure to update a pattern of active and inactive states for the transceiver circuitry of the NCR.

12. The NCR of claim 9, wherein the one or more processors are further configured to cause the NCR to:
transmit, to the BS, signaling indicating that the NCR will disable at least one of one or more transmitters of the NCR or one or more receivers of the NCR.

13. A method, comprising:
transmitting, to a network controlled repeater (NCR), configuration information to configure one or more receive (Rx) beams and corresponding time-domain resources, wherein:
the configuration information comprises at least one of a threshold amount of time or a duration of time,
the threshold amount of time corresponds to the NCR's monitoring for a physical uplink channel or signal from one or more user equipments (UEs) on the one or more Rx beams on the corresponding time-domain resources, and
the duration of time corresponds to the NCR's refraining from at least one of additional monitoring for reception of the physical uplink channel or signal from the one or more UEs or transmission of one or more synchronization signal block (SSBs) to the one or more UEs;
receiving, from the NCR, a request message to adjust at least one of the threshold amount of time or duration of time; and
transmitting, to the NCR, additional configuration information including at least one of an updated threshold amount of time or an updated duration of time.

14. The method of claim 13,
wherein the request message includes a request to perform at least one of:
a procedure to disable at least one of one or more transmitters or one or more receivers of the NCR; or
a procedure to update a pattern of ON and OFF states for the NCR.

15. The method of claim 13, further comprising:
receiving, from the NCR, signaling indicating that the NCR will disable at least one of one or more transmitters of the NCR or one or more receivers of the NCR.

16. The method of claim 13, further comprising
transmitting, to the NCR, side control information, wherein the side control information is usable by the NCR for determination of at least one of not to encode or decode signaling for a duration of time.

17. The method of claim 16,
wherein the side control information is transmitted via a physical downlink control channel (PDCCH).

18. The method of claim 16,
wherein the side control information comprises configuration information included as part of at least one of downlink control information (DCI), medium access control-control element (MAC-CE), or a system information block (SIB).

19. The method of claim 16, further comprising:
receive, from the NCR, a request for adjustment of a monitoring periodicity of a physical downlink control channel (PDCCH) carrying the side control information.

20. The method of claim 13, further comprising:
transmitting, to the NCR, capability signaling indicating support of configuring the NCR for at least one of enabling or disabling at least one of one or more transmitters of the NCR or one or more receivers of the NCR or transmitting side control information with an adjusted periodicity.

* * * * *